US010283745B2

(12) United States Patent
Yoneda et al.

(10) Patent No.: US 10,283,745 B2
(45) Date of Patent: May 7, 2019

(54) BATTERY PACK AND PRODUCTION METHOD THEREFOR

(71) Applicant: SANYO Electric Co., Ltd., Osaka (JP)

(72) Inventors: Haruhiko Yoneda, Hyogo (JP); Masami Haino, Hyogo (JP); Yuji Kishida, Hyogo (JP); Takeaki Wakabayashi, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 214 days.

(21) Appl. No.: 15/320,013

(22) PCT Filed: Mar. 9, 2015

(86) PCT No.: PCT/JP2015/001255
§ 371 (c)(1),
(2) Date: Dec. 19, 2016

(87) PCT Pub. No.: WO2016/006143
PCT Pub. Date: Jan. 14, 2016

(65) Prior Publication Data
US 2017/0155104 A1   Jun. 1, 2017

(30) Foreign Application Priority Data

Jul. 7, 2014  (JP) ................. 2014-139953

(51) Int. Cl.
H01M 2/10     (2006.01)
H01M 2/02     (2006.01)

(52) U.S. Cl.
CPC ....... H01M 2/1094 (2013.01); H01M 2/0237 (2013.01); H01M 2/1016 (2013.01); H01M 2/1022 (2013.01); H01M 2/1077 (2013.01); H01M 2220/20 (2013.01); H01M 2220/30 (2013.01)

(58) Field of Classification Search
CPC ............. H01M 2/0237; H01M 2/1016; H01M 2/1022; H01M 2/1077; H01M 2/1094; H01M 2220/20; H01M 2220/30
See application file for complete search history.

(56) References Cited

U.S. PATENT DOCUMENTS

2003/0170535 A1* 9/2003 Watanabe ........... H01M 2/0207
                                                    429/158
2012/0048630 A1* 3/2012 Nishiura .................. B60K 1/04
                                                    180/65.31
2015/0221899 A1* 8/2015 Knapp ................ H01M 2/0262
                                                    429/176

FOREIGN PATENT DOCUMENTS

JP   2007-317578   12/2007
JP   2007-317579   12/2007
JP   2012-079547    4/2012

OTHER PUBLICATIONS

Translation of par.0037 of JP 2007-317579A, published on Dec. 6, 2007 (Year: 2007).*
International Search Report of PCT application No. PCT/JP2015/001255 dated Jun. 9, 2015.
Extended European Search Report dated Mar. 20, 2017 in corresponding European Patent Application No. 15819398.7.

* cited by examiner

Primary Examiner — Anca Eoff
(74) Attorney, Agent, or Firm — Wenderoth, Lind & Ponack, L.L.P.

(57) ABSTRACT

This battery pack is assembled by welding an opening portion (20) of a waterproof bag (2) to provide an insertion opening (23) that is smaller than the total opening width (W) but allows a battery core pack (1) to be inserted, inserting the battery core pack (1) into the waterproof bag (2), then, closing the opening portion (20) of the waterproof bag (2), and placing the waterproof bag (2), in which the battery core pack (1) has been placed, into an external case (3). In this way, this battery pack can be assembled efficiently, with the battery core pack having been given a waterproof structure by the waterproof bag (2) while in an ideal state.

11 Claims, 3 Drawing Sheets

BATTERY PACK AND PRODUCTION METHOD THEREFOR

TECHNICAL FIELD

The present invention relates to a battery pack and a manufacturing method. The battery pack includes a battery core pack of a block shape including a plurality of batteries, a waterproof bag in which the battery core pack is inserted, an outer case which stores the battery core pack together with the waterproof bag.

BACKGROUND ART

A battery pack is widely used as a power source, such as, a power tool, an electric assist bicycle, an electric auto-bike, a hybrid vehicle, an electric vehicle, and the like, and in addition as electric power storages for home use, shop use, and the like. In these uses, the battery pack having the waterproof structure, can be used outdoor at ease. As the battery pack having the waterproof structure, the following structure is developed. The battery core pack is inserted in the waterproof bag, and this is stored in an outer case. (refer to Patent Literature 1)

CITATION LIST

Patent Literature

Patent Literature 1: Japanese Laid-Open Patent Publication No. 2012-79547

SUMMARY OF THE INVENTION

This battery core pack is inserted into a waterproof bag, and a lead wire connected to the battery pack extends out of the waterproof bag. Further, the battery pack is assembled by connecting the lead wire to an output terminal and a signal terminal of an outer case. This battery pack is assembled, while being carried at a plurality of steps in a state where the battery core pack is stored in the waterproof bag. When various postures of the waterproof bag are taken during the steps, there is a trouble that the battery core pack is not disposed at a fixed position and protrudes outside, or the like. It is difficult that the battery core pack stays inside the waterproof bag and prevent it from being protruded at the steps of, for example, making the waterproof structure by bending or welding an opening portion of the waterproof bag, injecting potting resin inside, or the like. Such a difficulty delays working steps.

The present invention is developed to resolve such a problem. An important object of the present invention is to provide a battery pack or its manufacturing method where the battery pack can be assembled efficiently, with the battery core pack having been given a waterproof structure by the waterproof bag while in an ideal state.

A manufacturing method of a battery pack of the present invention comprises: a step of inserting a battery core pack 1 through an opening portion 20 of a waterproof bag 2 made of flexible sheet with a lead wire 5 extending outside; a step of closing the opening portion 20; and a step of assembling into the battery pack 1 so as to insert the waterproof bag 2 storing the battery core pack 1 into an outer case 3. In the manufacturing method of the battery pack, as a pre-step before the inserting step, a step is provided of welding the flexible sheet 21 facing at the opening portion 20 as a welding portion 22, to form an inserting opening 23 smaller than a whole opening width (W). A size of the inserting opening 23 formed in the welding step is a size through which the battery core pack 1 is inserted, and the battery core pack 1 is inserted into the waterproof bag 2 through the inserting opening 23 at the inserting step.

In the manufacturing method of the battery pack of the present invention, the size of the inserting opening 23 formed in the welding step is a size through which the battery core pack 1 is not inserted in a direction where the battery core pack 1 is stored in the waterproof bag 2 and is inserted in a direction which is changed from the stored direction, and the battery core pack 1 is inserted into the waterproof bag through the inserting opening at the inserting step.

In the manufacturing method of the battery pack of the present invention, after the inserting step, a step is provided of injecting uncured pasty or liquid potting resin 4 into the waterproof bag 2, and the battery core pack 1 is buried in the potting resin 4 in the injecting step.

In the manufacturing method of the battery pack of the present invention, the welding portion 22 is a welding line 22A having a long narrow shape, and in the closing step, the lead wire 5 is disposed along the welding line 22A, and an inner welding line 24 is provided along the lead wire 5, and the lead wire 5 is disposed between the inner welding line 24 and the welding line 22A to extend outside the waterproof bag 2, and in this state, the inserting opening 23 is hermetically closed.

In the manufacturing method of the battery pack of the present invention, in the closing step, the inserting opening 23 of the waterproof bag 2 is hermetically closed.

In the manufacturing method of the battery pack of the present invention, in the welding step, the welding portion 22 is provided as a welding line 22A inclined relative to an opening edge of the opening portion 20, and in the closing step, the lead wire 5 is provided along the welding line 22A, and the opening portion 20 is bent so as to bend the welding line 22A and the lead wire 5.

A battery pack of the present invention comprises: a waterproof bag 2 made of flexible sheet; a battery core pack 1 inserted in the waterproof bag 2 with a lead wire 5 extending outside the waterproof bag 2; an outer case 3 which stores the waterproof bag 2 storing the battery core pack 1. The waterproof bag has an inserting opening 23 smaller than a whole opening width (W) of an opening portion 20 of the waterproof bag 2, by a welding portion 22 formed by welding the flexible sheet facing at the opening portion 20. A size of the inserting opening 23 is a size through which the battery core pack 1 is inserted.

The battery pack of the present invention, the size of the inserting opening 23 is a size through which the battery core pack 1 is not inserted in a direction where the battery core pack 1 is stored in the waterproof bag 2 and is inserted in a direction which is changed from the stored direction.

The battery pack of the present invention, potting resin 4 is injected into the waterproof bag 2, and the battery core pack 1 is buried in the potting resin 4.

In the battery pack of the present invention, the battery core pack 1 includes a plurality of battery cells 11, a circuit board 6 connected to the battery cells 11, a battery holder 12 for holding the circuit board 6 and the battery cells 11 at a fixed position. The potting resin 4 is injected inside the battery holder 12, and the potting resin 4 is injected between the circuit board 6 and the battery cells 11, and the circuit board 6 is disposed in a thermal-coupling state to each of the battery cells 11. The battery holder 12 has an injecting opening 15 for injecting the potting resin 4 at a back surface of the circuit board 6, and has an inclined surface 16 of a downward slope for making the potting resin 4 flow into between the circuit board 6 and the battery cells 11.

In the battery pack of the present invention, the battery cells 11 which are disposed at the back surface of the circuit board 6, are arranged in a state inclined in a downward slope toward a flowing direction of the potting resin 4.

In the battery pack of the present invention, the welding portion 22 is a welding line 22A having a long narrow shape, and the lead wire 5 is disposed along the welding line 22A, and an inner welding line 24 is provided along the lead wire 5, and the lead wire 5 is disposed between the inner welding line 24 and the welding line 22A.

In the battery pack of the present invention, the welding line 22A is inclined relative to an opening edge of the opening portion 20, and the lead wire 5 is provided along the welding line 22A.

In the battery pack of the present invention, the opening portion 20 of the waterproof bag 2 is bent so as to bend the welding line 22A and the lead wire 5.

A battery pack and a manufacturing method there of the present invention is characterized such that the battery pack can be assembled efficiently, with the battery core pack having been given a waterproof structure by the waterproof bag while in an ideal state. It is a reason why the waterproof bag has an inserting opening smaller than a whole opening width (W) of an opening portion, by a welding portion making the opening portion narrow at the opening portion of the waterproof bag, and then the battery core pack is stored through the inserting opening. In this battery pack, the battery core pack is prevented from protruding or going outside, when the battery core pack is inserted in the waterproof bag through the inserting opening, or various processes are carried out to the waterproof bag storing the battery core pack, or it is carried to next assembling steps. While this battery pack has the waterproof structure where the battery core pack is inserted in the waterproof bag, it is efficiently assembled in the assembling step, preventing the battery core pack from protruding or going outside the waterproof bag.

DESCRIPTION OF EMBODIMENTS

An embodiment of the present invention will be explained below according to figures. The battery pack of the present invention is mainly attached to electric vehicles used outdoor, and its power is supplied to a driving motor. The present invention is used as a power source for, such as, an electric assist bicycle, an electric auto-bike, an electric wheelchair, an electric tricycle, an electric cart, or the like. However, the present invention is not limited to uses of the battery pack, and the battery pack is also used as power sources of various electric devices which are used outdoors, such as, the power tool, or power sources for a house combined with solar cells.

Figure 1:
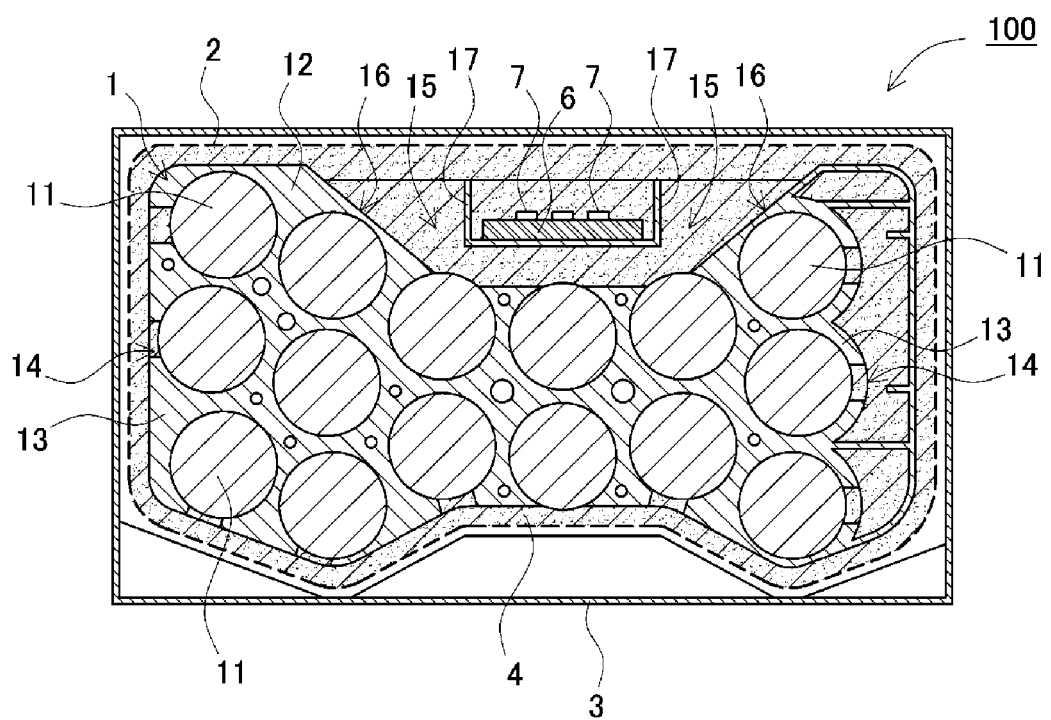
FIG. 1 is a schematic sectional view of a battery pack relating to an embodiment of the present invention.

Battery pack 100 shown in FIG. 1 of the present invention, is attached to an electric device body, and supplies power to the electric device body. In battery pack 100 used for this purpose, battery core pack 1 is inserted in waterproof bag 2, and this waterproof bag 2 is stored in outer case 3. In battery core pack 1, a plurality of battery cells 11 are disposed in a fixed position by battery holder 12. Battery cell 11 is a cylindrical battery cell which has positive and negative electrode terminals at both ends. In battery holder 12, the plurality of battery cells 11 are arranged in parallel each other, and electrode terminals at both ends of battery cells are disposed in the same plane, and then the plurality of battery cells 11 are arranged in a multi-stage multi-row arrangement. In battery cells 11 stored in battery holder 12, adjacent battery cells 11 are connected in series, or series and parallel by connecting lead plates to the electrode terminals (not shown).

Battery cells 11 are rechargeable lithium ion secondary batteries, but are not limited to lithium ion secondary batteries, and then any secondary batteries such as nickel hydride batteries, nickel cadmium batteries can be applied to the battery cells Further, in battery pack 100 of the embodiment, the battery cells are cylindrical battery cells, but are not limited to this, and then can be rectangular parallelepiped batteries (prismatic batteries) or flat batteries. In battery core pack 1, the plurality of battery cells 11 are arranged at parallel postures, and then are stored in battery holder 12.

In battery core pack 1 shown in the sectional view of FIG. 1, 15 pieces of battery cells 11 are disposed at parallel postures each other in battery holder 12. Battery holder 12 has holding pipes 13 where battery cells 11 are respectively inserted, and then holding pipes 13 holds battery cells 11 in fixed positions. Battery holder 12 is made of thermoplastic resin such as plastic of insulating material. This battery holder 12 are divided in two parts in the longitudinal direction of battery cell 11. The pair of the parts in battery holder 12 are coupled each other in a state where both ends of battery cells 11 are inserted in battery holder 12, and then dispose each of battery cells in fixed positions. Battery holder 12 has exposing openings 14 which expose parts of the surfaces of the battery cells in a state where battery cells 11 are inserted in holding pipes 13. Thus, exposing openings 14 are opened along the axes direction of battery cells 11. Battery cells 11 held at the fixed positions by being inserted into holding pipes 13 of battery holder 12, expose the surfaces of the battery cells through exposing openings 14. The exposed surfaces of battery cells 11 closely contact potting resin 4 injected, heat of battery cell 11 is radiated through potting resin 4 by heat transmission.

Opening windows which expose the electrode terminals provided at both ends of battery cells 11, are provided in battery holder 12. The lead plates for connecting adjacent battery cells 11 in series, are welded to the electrode terminals which are exposed from the opening window. Further, battery cells 11 are connected to circuit board 6 through the lead plates. Circuit board 6 has a protection circuit of battery cells 11, LEDs displaying the remaining capacity of battery cells 11, or the like. In battery core pack 1 of FIG. 1, circuit board 6 is disposed above battery holder 12. Circuit board 6 is disposed at a fixed position by battery holder 12 holding.

Potting resin 4 is injected into waterproof bag 2 in which battery core pack 1 shown in FIG. 1 is inserted. Potting resin 4 is made of insulating plastic such as urethane resin, and closely contacts the surfaces of battery cells 11, circuit board 6, or mounted components 7 of circuit board 6 in a state of heat transmission, to absorb heat. Then, it prevents temperature of battery cells 11, circuit board 6, or mounted components 7 from being increased. Potting resin 4 is uncured pasty or liquid, and is injected into waterproof bag 2. Then, potting resin 4 flows into under circuit board 6, and between battery cells 11, and is cured or hardened. Cured potting resin 4 closely contacts both surface of the front and back surfaces of circuit board 6, mounted components 7 such as semiconductor components included by circuit board 6, or the exposed surfaces of battery cells 11. Potting resin 4 closely contacting circuit board 6, mounted components 7, and battery cells 11, can conduct heat from circuit board 6, mounted components 7, and battery cells 11, to suppress temperature increases of them. Mounted components 7 included by circuit board 6 are semiconductor components such as FETs, diodes. Heat generation from them is conducted to potting resin 4. Especially, potting resin 4 closely contacting the surfaces of battery cells 11 effectively absorbs heat energy generated by temporary discharge or charge with a large current, to suppress temperature increase.

It is important that potting resin 4 closely contacts the surfaces of heat generation components such as battery cells 11, mounted components 7, or circuit board 6. When potting resin 4 failed in closely contacting, the heat generation of the heat generation components cannot be effectively conducted and radiated. Then the temperature of mounted component 7 increases largely, and a normal operation cannot be guaranteed. Further, the failure of contacting potting resin 4 and the exposed surfaces of battery cells 11 makes the battery temperature increased, and it makes battery cells 11 degraded, and it makes the life of battery cells 11 shortened. Additionally, in the battery pack where current of charge or discharge is restricted based on battery temperature, the restrictions of the current of charge or discharge are frequently carried out, and it also restricts the timings of charges or discharges with normal current.

Battery core pack 1 of FIG. 1 has a characterized structure in order to make potting resin 4 flow into in an ideal state. In order to make potting resin 4 quickly flow into under circuit board 6, battery holder 12 has injecting opening 15 next to the side of circuit board 6 for injecting potting resin 4. Battery holder 12 of FIG. 1 has injecting openings 15 opening upward, next to both sides of circuit board 6. Further, in order to make potting resin 4 injected through injecting opening 15 flow into between circuit board 6 and battery cells 11, that is, under circuit board 6, battery holder 12 has inclined surface 16 of a downward slope. Battery holder 12 of the figures has inclined surfaces 16, next to both sides of circuit board 6. Inclined surfaces 16 are disposed so as to be inclined toward the center axis of circuit board 6, and then it makes potting resin 4 injected through injecting openings 15 smoothly flow into under circuit board 6.

Battery holder 12 of FIG. 1 has inclined surfaces 16, from both sides of circuit board 6, to outside. Accordingly, potting resin 4 flowing into along inclined surface 16, after flowing into under circuit board 6, flows along the upper surfaces of battery cells 11, and flows into between battery cells 11. Battery cells 11 are disposed in a characterized arrangement such that potting resin 4 flowing along the upper surfaces of battery cells 11 is made flow into until the center axis of circuit board 6 more smoothly. Namely, battery cells 11 which are disposed at the back surface of circuit board 6, are arranged in a state or position inclined in a downward slope toward a flowing direction of potting resin 4. Potting resin 4 flows into at the back surface of circuit board 6, flowing in the direction indicated with arrows of FIG. 2. Battery core pack 1 of FIG. 1, has first to sixth rows from the right to left. In order that battery cells 11 are disposed in the state or position inclined in the downward slope toward the flowing direction of potting resin 4, battery cells 11 are arranged in the following way. Battery cell 1 of the first row is higher than battery cell 1 of the second row, and battery cell 1 of the second row is higher than battery cell 1 of the third row. Moreover, battery cells 11 are arranged in the following way. Battery cell 1 of the sixth row is higher than battery cell 1 of the fifth row, and battery cell 1 of the fifth row is higher than battery cell 1 of the fourth row. As potting resin 4 flows from both sides of circuit board 6 to the center axis portion thereof, battery cells 11 are arranged in the state or position inclined in the downward slope from both sides of circuit board 6 to the center axis portion thereof.

In battery core pack 1 above-mentioned, potting resin 4 flows into along inclined surface 16 of the downward slope, and then flows along the upper surfaces of battery cells 11 from inclined surface 16 into the center axis portion of the back surface of circuit board 6. In this battery core pack 1, potting resin 4 can surely flows even into the center axis portion of the back surface of circuit board 6, where it is difficult that a potting resin flows. Therefore, potting resin 4 can be injected into even the back surface of circuit board 6, and then the surface of circuit board 6 closely contacts potting resin 4 in an ideal state. Further, since potting resin 4 flows along the upper surface of battery cells 11 disposed in the downward slope from inclined surface 16 into the center axis portion, potting resin 4 can surely flows in close contact into even the upper surfaces of the battery cells 11 disposed under the center portion of the back surface of circuit board 6, where it is difficult that a potting resin flows. Potting resin 4 is also injected on the upper surface of circuit board 6. On the upper surface of circuit board 6, peripheral wall 17 is provided at the periphery of circuit board 6. Potting resin 4 are injected within peripheral wall 17, and then potting resin 4 can closely contact the whole surface of the upper surface of circuit board 6.

In order that battery core pack 1 realizes the water seal structure excellent in a waterproof property, waterproof bag 2 stores battery core pack 1. Especially, in a state where battery core pack 1 is tentatively fixed in waterproof bag 2, lead wires 5 extend from waterproof bag 2. Further, in a state where battery core pack 1 is disposed at a fixed position in waterproof bag 2, potting resin 4 is injected.

Waterproof bag 8 is made of a flexible sheet having a bag shape. The flexible sheet is preferably a plastic sheet. The plastic sheet can be made of material, such as, polyimide (PI), polyethylene imide (PEI), polyethylene terephthalate (PET), and the like. Those plastic sheets are excellent in flexibility and heat-resisting property. In addition, those plastic sheets are not dissolved by an electrolyte which is exhausted at the time of opening a safety valve of the battery cell, and do not cause a chemical reaction. Here, as the flexible sheet used for the waterproof, other plastic sheets other than the above can be used.

Waterproof bag 2 is formed in the bag shape as a preset shape, by processing flexible sheet material. Waterproof bag 2 of FIG. 2, flexible sheet having a pipe shape is cut in a preset length, and the cut pipe shape is welded at one end thereof, namely, at the bottom end in the figure, to make the bag shape. Since waterproof bag 2 is made by welding only the bottom end to make the bag shape, it can be effectively mass-produced. Here, both sides of the bag can be surely coupled. Otherwise, the waterproof bag may be made in the following way. Two sheets of flexible sheets are disposed to face each other, and then are welded at both side edges and a bottom edge, to make a bag shape. In this waterproof bag, the two sheets of the flexible sheets are disposed to face each other, and this waterproof bag has the shape where both side edges and the bottom edge are connected.

Figure 2:
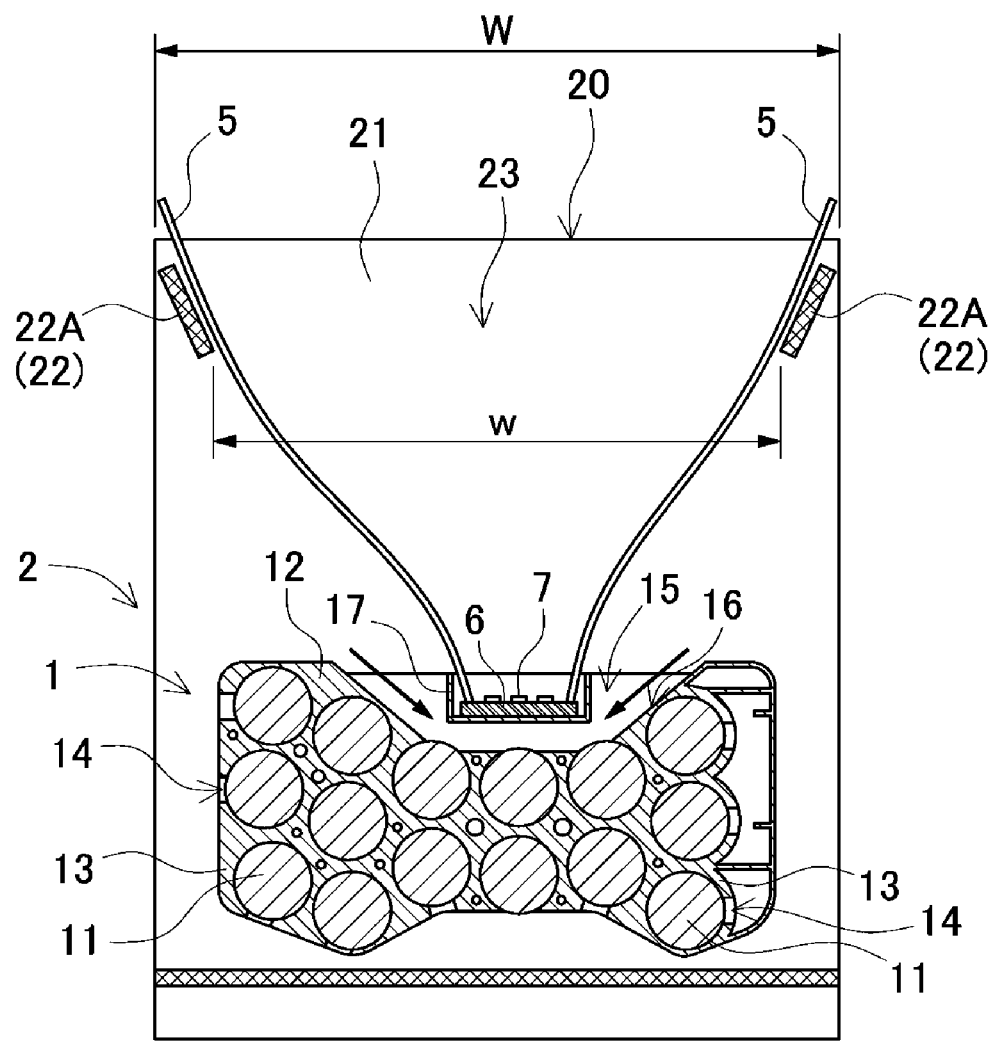
FIG. 2 is a sectional view showing a state where a battery core pack is stored in a waterproof bag.

Waterproof bag 2 is the bag shape having opening portion 20 at one end, and then battery core pack 1 is inserted and stored through opening portion 20, and then lead wires 5 extends through opening portion 20. Lead wires 5 are connected to connectors (not shown in the figures) fixed to outer case 2. Such connectors have charge/discharge terminals or signal lines. Accordingly, waterproof bag 2 stores battery core pack 1, and lead wires 5 also extend outward from opening portion 20 of waterproof bag 2. As shown in FIG. 2, lead wires 5 extend outward from opening portion 20 of waterproof bag 2 as a waterproof structure.

Waterproof bag 2 stores battery core pack 1, and lead wires 5 extend outward. Waterproof bag 1 of FIG. 2, has welding portions 22 which are welded by welding facing flexible sheets 21 at opening portion 20 in order to make opening portion 20 narrow. By welding portions 22, opening portion 20 of waterproof bag 2 becomes narrower than a whole opening width (W), and it is used as inserting opening 23 for inserting battery core pack 1. After providing welding portions 22 of waterproof bag 2, battery core pack 1 is inserted in waterproof bag 2 by passing battery core pack 1 through inserting opening 23. Therefore, an opening width (w) of inserting opening 23 has a size through which battery core pack 1 can be inserted. Here, in order that battery core pack 1 is able to be inserted through inserting opening 23 and is prevented from being protruded outside or going out at a carrying step or the like, the size of inserting opening 23 is a size through which battery core pack 1 is not able to be inserted in a direction or a posture where battery core pack 1 is stored in waterproof bag 2 and is able to be inserted in a direction which is changed from the stored direction.

In a state where battery core pack 1 stays in waterproof bag 2, potting resin 4 is injected into waterproof bag 2, or opening portion 20 is made a waterproof structure. Therefore, battery core pack 1 is made in a considerably bigger size than a size of battery core pack 1, so as to effectively process at these steps. In order that potting resin 4 surely flows into necessary portions, a part of waterproof bag 2 is deformed, or battery core pack 1 is moved within waterproof bag 2. Waterproof bag 2 is bent so as to make opening portion 20 done in a waterproof processing, or waterproof bag 2 is made so as to be conveniently welded. Thus, waterproof bag 2 is bigger than battery core pack 1. The big waterproof bag 2 has the big whole opening width (W), battery core pack 1 is able to be easily inserted in waterproof bag 2. However, there is a problem that battery core pack 1 protrudes or goes outside waterproof bag 2.

In order to resolve this problem, waterproof bag 2 of FIG. 2, includes welding portions 22 at opening portion 20 of waterproof bag 2. Thus, the opening width (w) of inserting opening 23 is smaller than the whole opening width (W). Ideally, inserting opening 23 has a size through which battery core pack 1 is able to be passed in a specific posture, namely, only a specific inserting posture. For example, waterproof bag 2 which stores enlonged battery core pack 1 as shown in FIG. 2, has a size of inserting opening 23 through which battery core pack 1 is able to be inserted at only an inserting posture of the longitudinal direction of battery core pack 1. Since waterproof bag 2 of this inserting opening 23 can pass battery core pack 1 at only the inserting posture of the longitudinal direction of battery core pack 1, it can ideally prevent battery core pack 1 from protruding or going outside. Here, as waterproof bag 2 has the opening width (w) of inserting opening 23 smaller than the whole opening width (W), the opening width (w) of inserting opening 23 does not necessarily need to be limited to the size through which battery core pack 1 is able to be passed at the specific inserting posture thereof. It is a reason why waterproof bag 2 can suppress battery core pack 1 in protruding or going out, compared with waterproof bag 2 having no welding portion 22, as waterproof bag 2 has the opening width (w) of inserting opening 23 smaller than the whole opening width (W). Especially, the opening width (w) of inserting opening 23 is preferably 110% or less of the value that the width and height of battery core pack 1 are added in the direction stored in waterproof bag 2, and more preferably 105% or less. It can prevent battery core pack 1 from protruding or going outside waterproof bag 2, and can effectively assemble.

Waterproof bag 2 of FIG. 2 has welding portions 22 at both sides of opening portion 20, and has inserting opening 23 between welding portions 22 of both sides. Welding portions 22 are respectively enlonged welding lines 22A, and welding lines 22A are inclined relative to an opening edge of opening portion 20 of waterproof bag 2, in other words, to side edges of waterproof bag 2. The length of each welding line 22A is, for example, 2 cm or more, and 7 cm or less, and preferably 3 cm or more, and 6 cm or less, and more preferably approximately 5 cm. Inclined welding lines 22A are inclined so as to gradually increase the opening width toward opening portion 20. In waterproof bag 2 having welding lines 22A, battery core pack 1 can be smoothly inserted in waterproof bag 2, and it can also surely prevents battery core pack 1 from protruding or going outside. It is a reason why battery core pack 1 is able to be inserted along welding lines 22A.

Figure 3:
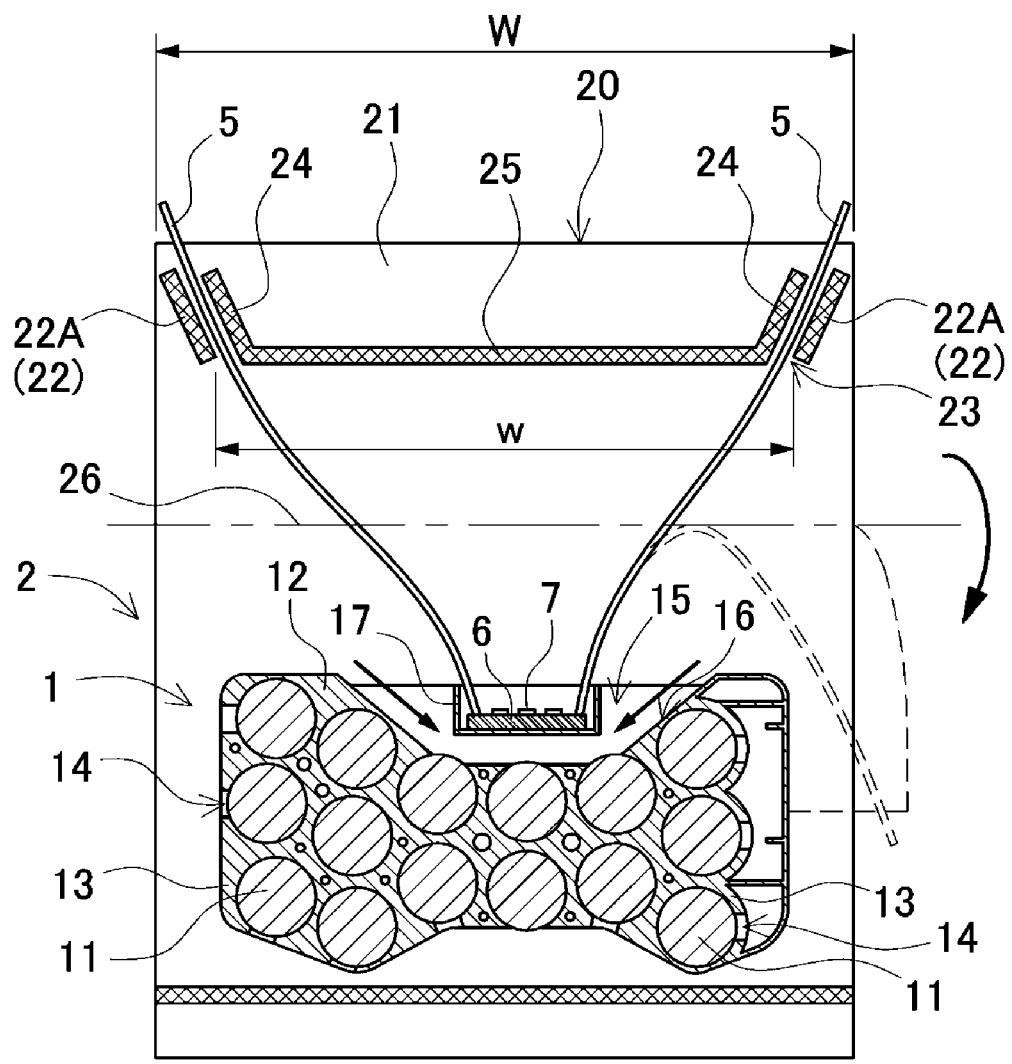
FIG. 3 is a sectional view showing a state where an opening portion of the waterproof bag shown in FIG. 2 is welded.

After battery core pack 1 is inserted in waterproof bag 2, lead wires 5 are disposed along the inner sides of welding lines 22A, and then inner welding lines 24 are provided along lead wires 5 as shown FIG. 3. Inner welding lines 24 are provided such that facing flexible sheets 21 are welded in enlonged shapes in the same way as welding lines 22A. Inner welding lines 24 are provided at the inner sides of lead wires 5, and then lead wires 5 are disposed between inner welding lines 24 and welding lines 22A. Inner welding lines 24 are provided in parallel with welding lines 22A, and in a posture where those are inclined relative to the opening edge of opening portion 20 of waterproof bag 2. A space or distance between inner welding line 24 and welding line 22A is, for example, approximately 1.5 cm such that lead wire 5 is able to be disposed. This space is set as narrow as possible at the range where lead wire 5 is able to be disposed.

Further, waterproof bag 2 of FIG. 3, has waterproof line 25 for closing opening portion 20 in a waterproof structure. Waterproof line 25 is provided such that facing flexible sheets 21 of opening portion 20 are welded in an enlonged shape in the same way as welding lines 22A. This waterproof line 25 is provided in parallel with the opening edge of waterproof bag 2. Waterproof line 25 closes opening portion 20 of waterproof bag 2 in the waterproof structure, by connecting both ends of it to inner welding lines 24 of both sides. In waterproof bag 2 of FIG. 3, both ends of waterproof line 25 are connected to the inner side ends of inner welding lines 24.

Waterproof bag 2 storing battery core pack 1, is stored in outer case 3. In waterproof bag 2 stored in outer case 3, as shown by an alternate long and short dash line of FIG. 3, opening portion 20 is bent at bending line 26, to make a whole size compact. Lead wire 5 is disposed between inner welding line 24 and welding line 22A, at a fixed position, and at a posture inclined relative to the opening edge of waterproof bag 2. Lead wire 5 is bent at a posture inclined relative to the bending line, and is curved in a predetermined radius of curvature, as shown by a chain line of FIG. 3 in a state of bending opening portion 20. Namely, lead wire 5 can be bent without overlapping in the state where opening portion 20 of waterproof bag 2 is bent. Additionally, lead wire 5 can be bent in the large radius of curvature. Thus, bent opening portion 20 can be made thin, and also lead wire 5 can smoothly be being bent. Further, a disconnection by curving lead wire 5 in a small radius of curvature can be prevented. Battery pack 100 including a lot of battery cells 11, has a large charge/discharge capacity, and a large output current. Therefore, thick lead wire 5 having a large allowable current rate, is used. When thick lead wire 5 is bent and overlapped, it is made thick, and also it is difficult to bend it in a small radius of curvature. However, as shown in FIG. 3, lead wire 5 is disposed at the inclined posture, and then opening portion 20 of waterproof bag 2 is bent. Therefore, lead wire 5 can be easily bent without overlapping lead wire 5, in the large radius of curvature. Further, opening portion 20 of waterproof bag 2 may be bent twofold or three fold to make it compact and to improve waterproof property, and then waterproof bag 2 is stored in outer case 3. Especially, in this battery pack 100, since lead wire 5 is bent without overlapping, it is characterized that opening portion 20 of waterproof 2 is made thin, and is smoothly bent.

In waterproof bag 2 of FIG. 3, lead wires 5 extend outside from both sides of opening portion 20. For example, In this battery pack 100, lead wire 5 of the output line from one side of waterproof bag 2 extends outside, and lead wire 5 of the signal line from the other side of waterproof bag 2 extends outside.

As shown in the sectional view of FIG. 1, outer case 3 stores waterproof bag 2 which stores battery core pack 1. Outer case 3 has a box shape which is molded in a closing structure and is made of plastic. Outer case 3 is divided into two parts of plastic which are molded. The two parts of outer case 3 are closed to store waterproof bag 2 inside. This outer case 3 has connectors (not shown in the figures) which have output terminals or signal terminals, and then lead wires 5 of battery core pack 1 are connected to the connectors.

Battery pack 100 above-mentioned, is manufactured by the following steps.

1. In a welding step, welding lines 22A are made by welding opening portion 20 of waterproof bag 2 in a long narrow shape (an enlonged shape). Thus, inserting opening 23 of opening width (w) which is narrower than the whole opening width (W), is provided at opening portion 20. Otherwise, the welding step can be carried out when waterproof bag 2 is made.

2. In an inserting step, battery core pack 1 is inserted in waterproof bag 2.

Then, lead wires 5 are disposed along welding line 22A, and inner welding lines 24 are made by welding opening portion 20 of waterproof bag 2 along lead wires 5. Inner welding lines 24 are provided at the inner sides of lead wires 5.

Then, potting resin 4 is injected in waterproof bag 2. Potting resin 4 is injected inside through injecting opening 15 of battery holder 12. Potting resin 4 injected through injecting opening 15, flows along inclined surface 16 into the back surface of circuit board 6, and then flows along the upper surfaces of battery cells 11 disposed so as to be inclined in the downward slope in the flowing direction, and then potting resin 4 closely contacts the back surface of the circuit board 6 and battery cells 11. In the present invention, potting resin 4 is injected at the upper surface of circuit board 6. Potting resin 4 closely contacts circuit board 6, mounted components 7, and battery cells 11, namely, is injected in a thermal-coupling state.

3. Then, in a closing step, waterproof line 25 is made at waterproof bag 2 in which potting resin 4 is injected, and thus opening portion 20 is closed in the waterproof structure. Waterproof line 25 is provided by connecting both ends of it to inner welding lines 24. Potting resin 4 is injected before making waterproof line 25. Instead, after making waterproof line 25, potting resin 4 can be injected inside waterproof bag 2 by inserting a nozzle between welding lines 22A and inner welding lines 24.

4. In an assembling step, waterproof bag 2 in which battery core pack 1 is stored and opening portion 20 is closed, is stored in outer case 3, and then outer case 3 is closed. Since battery core pack 1 has the waterproof structure by being inserted in waterproof bag 2, it is not necessary that outer case 3 has a hermetical waterproof structure. Here, needless to say, a more secure waterproof structure can be obtained by adopting a waterproof structure of outer case 3.

INDUSTRIAL APPLICABILITY

The battery pack of the present invention can be used in electric bicycles used outdoor, since it has a waterproof structure where a battery core pack is inserted in a waterproof bag.

The invention claimed is:

1. A manufacturing method of a battery pack comprising:
a step of inserting a battery core pack through an opening portion of a waterproof bag made of flexible sheet with a lead wire extending outside;
a step of closing the opening portion; and
a step of assembling into the battery pack so as to insert the waterproof bag storing the battery core pack into an outer case,
wherein as a pre-step before the inserting step, a step is provided of welding the flexible sheet facing at the opening portion as a welding portion, to form an inserting opening smaller than a whole opening width (W),
a size of the inserting opening formed in the welding step is a size through which the battery core pack is inserted, and the battery core pack is inserted into the waterproof bag through the inserting opening at the inserting step, and
the size of the inserting opening formed in the welding step is a size through which the battery core pack is not inserted in a direction where the battery core pack is stored in the waterproof bag and is inserted in a direction which is changed from the stored direction, and the battery core pack is inserted into the waterproof bag through the inserting opening at the inserting step.

2. The manufacturing method of the battery pack according to claim 1,
wherein after the inserting step, a step is provided of injecting uncured pasty or liquid potting resin into the waterproof bag, and the battery core pack is buried in the potting resin in the injecting step.

3. The manufacturing method of the battery pack according to claim 1,
wherein the welding portion is a welding line having a long narrow shape,
in the closing step, the lead wire is disposed along the welding line, and an inner welding line is provided along the lead wire, and the lead wire is disposed between the inner welding line and the welding line to extend outside the waterproof bag, and in this state, the inserting opening is hermetically closed.

4. The manufacturing method of the battery pack according to claim 1,
wherein in the closing step, the inserting opening of the waterproof bag is hermetically closed.

5. The manufacturing method of the battery pack according to claim 1,
wherein in the welding step, the welding portion is provided as a welding line inclined relative to an opening edge of the opening portion, and in the closing step, the lead wire is provided along the welding line, and the opening portion is bent so as to bend the welding line and the lead wire.

6. A battery pack comprising:
a waterproof bag made of flexible sheet;
a battery core pack inserted in the waterproof bag with a lead wire extending outside the waterproof bag;
an outer case which stores the waterproof bag storing the battery core pack,
wherein the waterproof bag has an inserting opening smaller than a whole opening width (W) of an opening portion, by a welding portion formed by welding the flexible sheet facing at the opening portion, and a size of the inserting opening is a size through which the battery core pack is inserted,
a potting resin is injected into the waterproof bag, and the battery core pack is buried in the potting resin,
the battery core pack includes a plurality of battery cells, a circuit board connected to the battery cells, a battery holder for holding the circuit board and the battery cells at a fixed position,
the potting resin is injected inside the battery holder, and the potting resin is injected between the circuit board and the battery cells, and the circuit board is disposed in a thermal-coupling state to each of the battery cells, and
the battery holder has an injecting opening for injecting the potting resin at a back surface of the circuit board, and has an inclined surface of a downward slope for making the potting resin flow into between the circuit board and the battery cells.

7. The battery pack according to claim 6,
wherein the size of the inserting opening is a size through which the battery core pack is not inserted in a direction where the battery core pack is stored in the waterproof bag and is inserted in a direction which is changed from the stored direction.

8. The battery pack according to claim 6,
wherein the battery cells which are disposed at the back surface of the circuit board, are arranged in a state inclined in a downward slope toward a flowing direction of the potting resin.

9. The battery pack according to claim 6,
wherein the welding portion is a welding line having a long narrow shape, and the lead wire is disposed along the welding line, and an inner welding line is provided along the lead wire, and the lead wire is disposed between the inner welding line and the welding line.

10. The battery pack according to claim 9,
wherein the welding line is inclined relative to an opening edge of the opening portion, and the lead wire is provided along the welding line.

11. The battery pack according to claim 10,
wherein the opening portion is bent so as to bend the welding line and the lead wire.

* * * * *